US005119113A

United States Patent [19]

Prakash et al.

[11] Patent Number: 5,119,113

[45] Date of Patent: Jun. 2, 1992

[54] SPOT-DEFINED EXPOSURE SYSTEM FOR A LASER PRINTER

[75] Inventors: Ravinder Prakash, Concord, N.C.; Larry L. Wolfe, Broomfield, Colo.

[73] Assignee: International Business Machines Corporation, Armonk, N.Y.

[21] Appl. No.: 596,148

[22] Filed: Oct. 11, 1990

[51] Int. Cl.[5] .......... G01D 9/42

[52] U.S. Cl. .......... 346/108; 250/215; 250/234; 346/160; 355/52; 355/200; 355/210

[58] Field of Search .......... 346/108, 160; 250/215, 250/234, 235, 236; 355/200, 202, 210, 228, 229, 52; 359/216, 217, 218

[56] References Cited

U.S. PATENT DOCUMENTS

| | | | |
|---|---|---|---|
| 4,661,699 | 4/1987 | Welmers et al. | 250/235 |
| 4,818,046 | 4/1989 | Kondo | 250/236 |
| 4,896,169 | 1/1990 | Kuwabara et al. | 346/108 |
| 4,928,122 | 5/1990 | Doi et al. | 346/160 |
| 5,029,956 | 7/1991 | Takanashi et al. | 250/236 |

*Primary Examiner*—A. T. Grimley
*Assistant Examiner*—Sandra L. Brasé
*Attorney, Agent, or Firm*—J. Robert Hanway

[57] ABSTRACT

An exposure system for electrophotographic apparatus having an aperture plate for masking one or more laser beams. The plate contains one or more apertures which have irregular edges to form a gaussian light distribution for the light beams passing through the apertures. A saw-toothed edge is used with a predetermined amplitude ratio to predictably attenuate the light at the edges which correspond to the process or in-track direction in the exposed image. The gaussian distribution is more tolerable of spacing changes in scan lines and improves the continuity of process direction lines in the finished image.

16 Claims, 3 Drawing Sheets

SPOT-DEFINED EXPOSURE SYSTEM FOR A LASER PRINTER

BACKGROUND OF INVENTION

1. Field of the Invention

This invention relates, in general, to printing devices and, more specifically, to laser printers utilizing multiple-spot exposure of a photosensitive member.

2. Description of the Prior Art

Many traditional laser printers use a single laser beam which is modulated and scanned across the surface of a photosensitive member. The selective exposure of a photosensitive member provided by this system creates a latent image which can be developed and transferred to the hard copy output medium, such as a sheet of paper. Since the beam must scan the entire page area to create the image, the throughput or speed of the printer is dependent upon the scanning time.

In order to produce faster printers with comparable quality outputs, some printers use more than one modulated laser beam in the scanning and exposure process. For example, a system which uses three simultaneously modulated laser beams which are scanned together across the photosensitive surface or member can expose the member in one third the time required by the single laser scanning system. Each of the three beams can scan adjacent lines in the image being created or they can be interlaced with other lines to be scanned in subsequent scan passes. The individual laser beams can be derived from individual laser devices, such as laser diodes, or from a single laser device whose beam has been split, before modulation, into two or more beams. U.S. Pat. No. 4,884,857, issued on Dec. 5, 1989 to the same assignee as the present invention and which is herein incorporated by reference, discloses a multiple-beam laser scanning system.

One of the difficulties of multiple-beam laser scanning systems is that it is difficult to maintain exact placement of the beams in the process or in-track direction of the scan. This is needed to prevent lines or characters which have continuity in the process direction from appearing irregular. This is especially true in the case where laser diodes are used as the light producing device and the optical components of the system effectively enlarge the spacing between the diodes when imaged onto the photosensitive member.

One way to reduce the tight tolerance requirements needed for the diode spacing, and hence the laser beam spacing, is disclosed in the referenced patent. As taught therein, an aperture plate is positioned between the stationary beams and the optical system which provides the deflection necessary to scan the beams across the photosensitive member. The aperture plate contains apertures or openings through which the beams pass. The beam impinging upon an aperture is larger than the aperture, thus causing only the portion of the beam passed by the aperture to reach the photosensitive member. This effectively causes the separation between the apertures in the plate to govern the scan line spacing on the photosensitive member. The plate maintains that spacing even with some variation in the laser beam position due to physical or electrical changes in manufacturing or operation of the laser diode array.

Even though the arrangement disclosed in the referenced patent is advantageous in certain applications, it can experience the difficulty of irregular lines when the spacing provided by the aperture is not exact or when process movement of interlaced scans causes some in-track or process direction deviation from the exact position of the scanned line. The process or in-track scan direction refers to the direction in which the photosensitive member travels past the imaged laser beam. The scan or cross-track direction refers to the direction in which the beam moves across the photosensitive member as a result of the scanning action of the beam deflecting system. The terms process and scan are also defined in the referenced patent.

In order to overcome the irregularity aspect of the prior art, the present invention uses an aperture plate which has apertures designed to give other than a sharp edge to the beam which passes through the aperture. This is contrary to conventional practice for apertures. Normally an aperture is used for sharply cutting off the edges of the beam passing through the aperture. Several prior art patents show various systems which use apertures of various configurations to perform different functions, none of which is similar to the present invention. U.S. Pat. No. 4,321,630, issued on Mar. 23, 1982, and U.S. Pat. No. 4,057,342, issued on Nov. 8, 1977, are representative of references which use specially shaped slits or apertures across the width of the image to regulate or shape the image-wide light which is irradiated onto the photosensitive member or received from the original document being copied. See FIGS. 9 through 13 of U.S. Pat. No. 4,057,342 and FIG. 8 of U.S. Pat. No. 4,321,630.

U.S. Pat. No. 3,813,140, issued on May 28, 1974, and U.S. Pat. No. 4,725,729, issued on Feb. 16, 1988, both represent references which use apertures or openings having irregular shapes to compensate for other nonlinear properties of the scanning system which results in light changes being dependent upon the scan angle. See FIGS. 4 and 5 of U.S. Pat. No. 4,725,729 and FIG. 6 of U.S. Pat. No. 3,813,140. In both representative cases, the beam of light passes through the apertures at different positions, depending upon the angle of the light ray or beam which enters the aperture. U.S. Pat. Nos. 3,055,263, issued on Sep. 25, 1962, and 4,433,911, issued on Feb. 28, 1984, are representative of references which use specially shaped apertures or openings to determine distances or locations of object images passing through the aperture. See FIG. 7 of U.S. Pat. No. 3,055,263 and FIGS. 1 and 2 of U.S. Pat. No. 4,433,911.

For the reasons indicated, it is desirable, and it is an object of this invention, to provide an exposure system which improves the process direction continuity of adjacent scan lines.

SUMMARY OF THE INVENTION

There is disclosed herein a new and useful exposure system for irradiating a photosensitive member in an electrophotographic device, such as a printer, copier, or duplicator. The exposure system conditions the light beams impinging upon the photosensitive member to provide a gaussian light intensity distribution or profile. This affords higher quality adjacent scan line continuity even with variations in scan line position caused by process deviation or laser beam misalignment. The invention is particularly useful in systems employing multiple-spot beam scanning.

According to a specific embodiment of the invention, a multiple-spot laser beam passes through an aperture plate containing an aperture for each beam. After passing through the apertures, the beams are deflected by a rotating polygon to simultaneously scan the lines across the photosensitive member. Each aperture is defined by a generally rectangular opening which is slightly larger than the laser beam in a dimension ultimately corresponding to the cross-track or scan direction of the beam. The opening is slightly smaller than the laser beam in a dimension which ultimately corresponds to the in-track or process direction of the beam. Two sides of the opening are defined by irregular, non-smooth edges having a saw-toothed shape. These edges regulate the cut-off of the light at the edges and determine the light intensity distribution, or profile, in the process direction of the scan line.

By proper selection of the amplitude of the saw-toothed shape, the desired gaussian distribution can be achieved with an inexpensive device and without appreciable loss in light energy. This reduces the effect of discontinuities in the output image due to changes in scan line spacing from that produced by prior art aperture plates. A value between 0.175 and 0.225 for the ratio of amplitude to the repeating distance of the saw-toothed edges provides an acceptable compromise between intensity profile, intensity attenuation, and tolerance of scan line variations.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
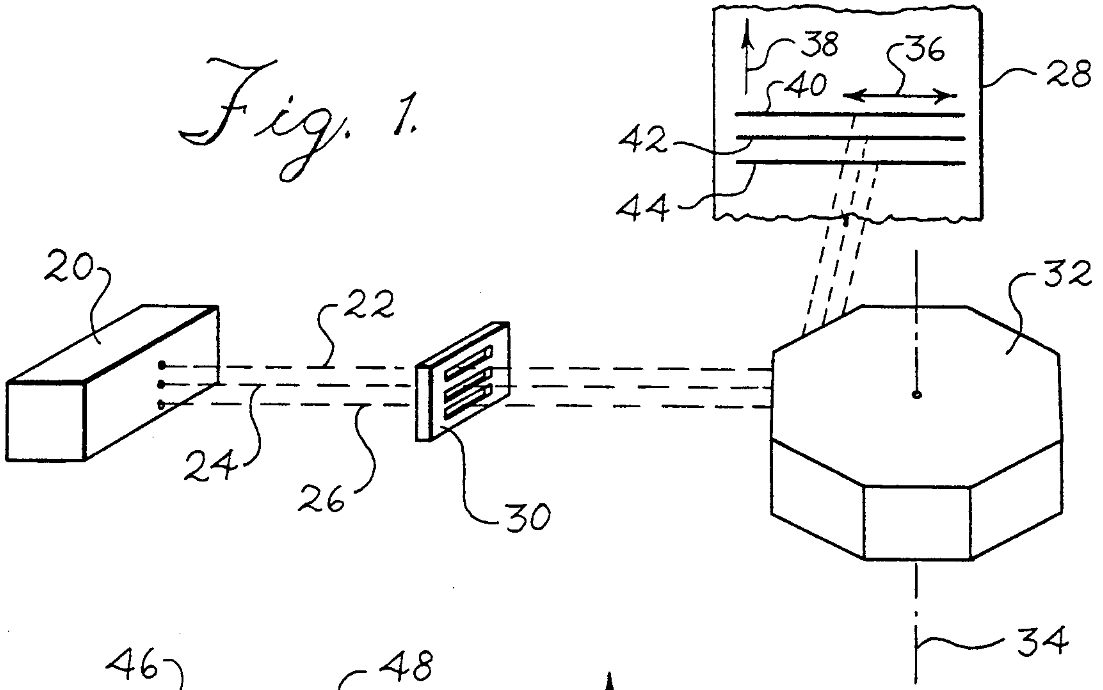
FIG. 1 is a diagrammatic view of an exposure system constructed according to this invention.

Throughout the following description, similar reference characters refer to similar elements or members in all of the figures of the drawings.

Referring now to the drawings, and to FIG. 1 in particular, there is shown an exposure system constructed according to this invention. A light source 20 is used to produce several parallel and stationary light beams, such as beams 22, 24 and 26. These beams may be produced by individual laser diodes or may be produced by dividing the beam from a single laser source. Although not shown in FIG. 1, the individual laser or light beams would be modulated appropriately with the information content necessary to selectively expose the image area on the photosensitive member 28.

The light beams 22, 24 and 26 pass through apertures in the aperture plate 30 and are deflected by the polygon 32 which rotates around the axis 34. Such rotation causes the light beams to scan across the photosensitive member 28 in the direction indicated by the double-ended arrow 36. This is referred to as the cross-track or scan direction. Although the three scan lines depicted in FIG. 1 have a gap therebetween in the process or in-track direction, indicated by arrow 38, the actual spacing desired in an actual system would be much less than indicated. For a high quality output, the spacing between the scan lines 40, 42 and 44 should be essentially equal to zero. For clarity reasons, some of the conventional pre-scan and post-scan optical elements normally required with such systems are not shown in FIG. 1. Also not shown in FIG. 1 are some of the other process stations which would work in conjunction with the exposure system. These would include, normally, the toning or developing station, the transfer station which transfers the developed image on the photosensitive member to a hard copy medium such as a sheet of paper, and a fixing or fusing station for permanently fusing the transferred image to the paper.

The aperture plate 30 used in the exposure system of FIG. 1 contains three apertures or openings which are aligned to prevent the passage of a portion of the three light beams. By using the aperture plate 30, the shape of the beams impinging upon the photosensitive member 28 can be controlled. The aperture plate 30 also allows the spacing between the scanned lines to be maintained more accurately even with differences or changes in the direction and spacing of the beams emitted from the light source 20. However, conventional aperture plates with smooth rectangular openings or apertures exhibit certain properties which can be detrimental to the overall image quality of the produced image, especially in the process direction.

Figure 2:
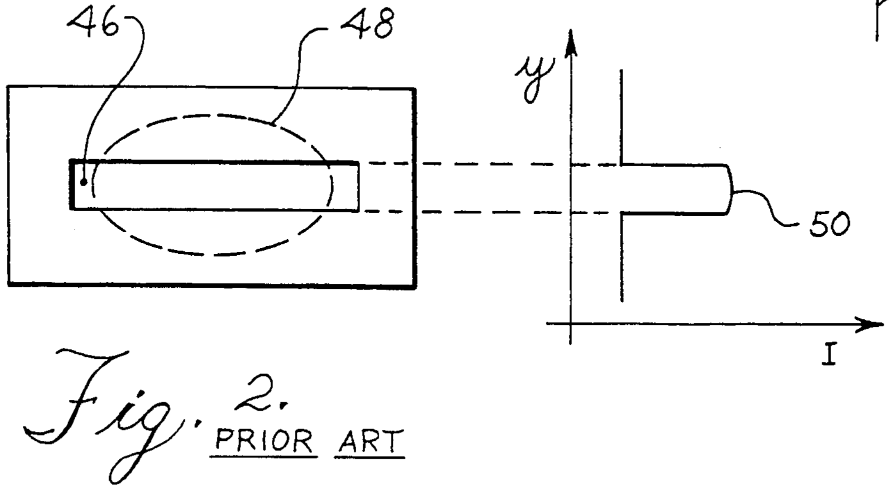
Fig. 2. PRIOR ART
FIG. 2 is a view illustrating the light intensity distribution after passing through an aperture constructed according to the prior art.

FIG. 2 illustrates a prior art aperture geometry and the resulting light intensity distribution of a laser or light beam after passing through the aperture. According to FIG. 2, the aperture 46 has a rectangular shape which is smaller in the vertical direction than the size of the laser beam 48 which impinges upon the aperture. The distribution of the light intensity "I" as a function of the vertical direction or dimension "y" is shown by the curve 50 in FIG. 2. As can be seen, the distribution of the light intensity has a substantially square wave characteristic in that all of the light intensity is contained within the region corresponding to the opening or aperture 46. Substantially no light exists in the regions above and below the aperture opening. It is to be understood that, in an actual system there may be some magnification or demagnification involved in the light beam before it impinges upon the photosensitive member. Consequently, the size of the spot does not necessarily correspond one-for-one with the size of the aperture. The important thing to note here is that the distribution of the light intensity drops off sharply because of the attenuating or masking effect of the aperture as will be described in more detail hereinafter. Difficulties with this type of distribution can occur in producing smooth and continuous image lines in the process direction.

Figure 3:
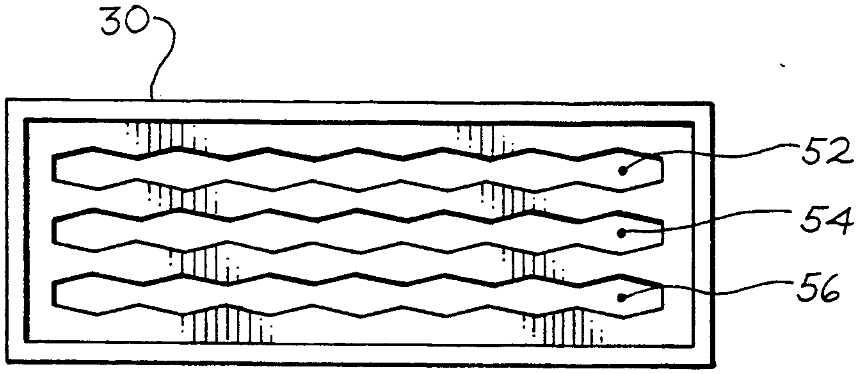
FIG. 3 is a plan view of an aperture plate constructed according to a specific embodiment of this invention.

FIG. 3 illustrates, in greater detail, the aperture plate 30 shown in FIG. 1. According to FIG. 3, the apertures or openings 52. 54 and 56 are impinged by the laser beams 22, 24 and 26, respectively, shown in FIG. 1. Although not drawn to scale in FIG. 3, the apertures in the plate 30 are no larger than is necessary to mask one single laser beam with some additional area on each side of the laser beam which is not masked. The non-masked area effectively leaves the laser beam unaltered in the cross-track or scan direction. As shown in FIG. 3, the apertures 52, 54 and 56 are generally rectangular in shape but the two opposite sides thereof, which are generally parallel, have irregular or non-smooth surfaces as compared to the prior art aperture geometry. The saw-toothed shape of the two sides defining each aperture is used to define and develop a specific light intensity distribution or profile of the laser beam passing through the aperture. It is the enhanced distribution of the light intensity which provides the advantages of the invention over the prior art.

Figure 4:
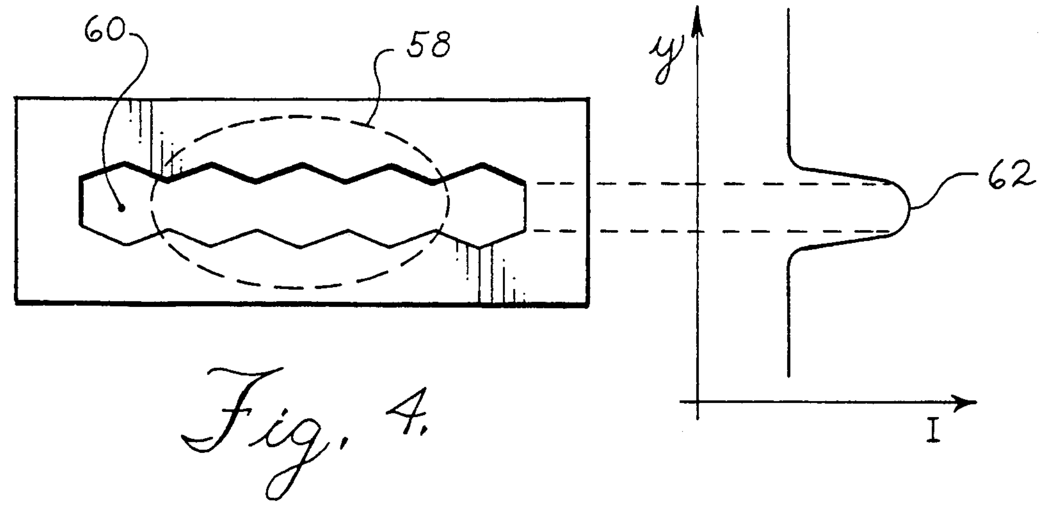
FIG. 4 is a view illustrating the light intensity distribution after passing through an aperture constructed according to the embodiment shown in FIG. 3.

FIG. 4 illustrates the operation of the apertures constructed according to this invention and the resulting light intensity distribution or profile diagram. As shown in FIG. 4, a laser beam 58 impinging upon the aperture 60 produces the light intensity illustrated by curve 62 after it passes through the aperture. As can be seen from curve 62, the light intensity distribution is substantially a gaussian distribution, which is more normal for light sources than the square wave type distribution, shown in FIG. 2, provided by the prior art apertures. As will be indicated herein, gaussian distribution provides for a much more predictable and tolerable result in the output image, primarily for the vertical or process lines in the produced image which rely on accurate spacing and distribution between the scan lines.

Figure 5:
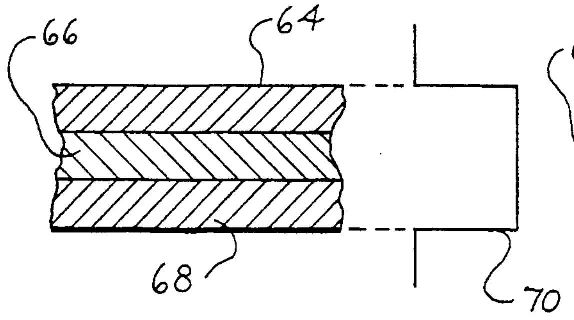
FIG. 5 depicts the desired or ideal intensity profile for a three-line scan.

FIG. 5 illustrates the ideal or desired condition for spacing and light distribution between scan lines on the output medium and, intermediately, on the photosensitive member. Ideally, the spacing between the scan lines 64, 66 and 68 should be zero as shown in FIG. 5. With a sharp or step-type intensity profile, and neglecting any small intensity variations of the light between the sharp cut-off edges the vertical intensity profile of the three line combination, used here as an example, is represented by curve 70. This indicates that the intensity of the line in the vertical direction is constant over all three lines. While this is the desired condition, it should be appreciated that this is difficult to achieve with actual apparatus and some overlapping or gaps between the lines can occur which can detrimentally affect the continuity of the light intensity in the vertical direction.

Figure 6:
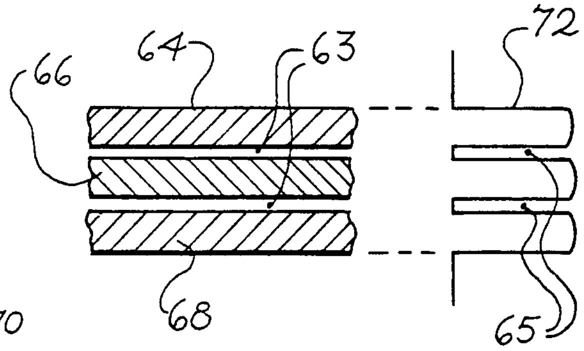
FIG. 6 depicts a three-line scan and the corresponding intensity profile for laser beams passing through the prior art aperture plate and having a space therebetween.
Figure 7:
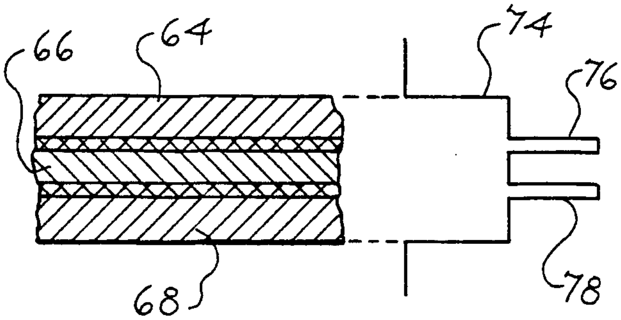
FIG. 7 depicts a three-line scan and the corresponding intensity profile for laser beams passing through the prior art aperture plate and being overlapped.

FIGS. 6 and 7 illustrate what happens to the light distribution in the vertical direction, when the scan lines have gaps or overlap, with apertures having the prior art geometry. As shown in FIG. 6, a gap 63 between the scan lines 64, 66 and 68 causes gaps 65 in the output curve 72 because of the lack of light intensity existing in the three laser beams which form the scan lines outside of the area passing through the aperture. The distribution shown in curve is detrimental to the overall quality of the produced image since lines in the process direction will not be uniform. A similar reduction in quality is experienced when the scan lines 66 and 68 overlap each other as shown in FIG. 7. With this condition, the output curve 74 includes spikes occurring at the area where the scan lines overlap such as spikes 76 and 78. These are caused by the full intensity of the light adding at the region where the scan lines overlap. Thus, as can be seen in FIGS. 6 and 7, the difficult task of maintaining the scan lines in exact alignment to maintain high image quality is necessary. This is difficult to do in actual practice, especially with laser diode arrays. Alignment problems also exist when the scan lines are interlaced with other scan lines in the process direction. This type of deviation occurs mainly due to the mechanics of the interlacing system rather than to the spacing between the laser emitters. Whatever the cause of the spacing changes, the fact that the prior art aperture system produces a degraded image when the spacing is not ultimate is an important and difficult to achieve spacing requirement.

Figure 8:
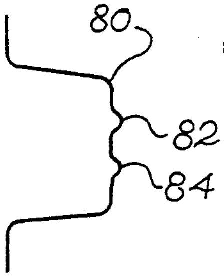
FIG. 8 illustrates a three-line scan intensity profile of overlapping beams which have passed through the aperture plate of this invention.

FIG. 8 represents the light intensity distribution realized when the scan lines overlap slightly when using the aperture plate of this invention. Since the distribution of each single laser beam is substantially gaussian, as shown by curve 62 in FIG. 4, there is not the sharp cutoff of light intensity as the distance from the center of the beam is varied. In other words, some overlapping of the beams occur even when perfectly aligned and, when the spacing is decreased, the intensity is increased somewhat, but not by the amount of the step function dictated by the prior art light intensity distribution. In this regard, curve 80 of FIG. 8 represents the composite three-line scan profile where there is some overlapping between the scan lines, with the curve peaks 82 and 84 being the only variation in the composite output from a desired smooth output.

Figure 9:
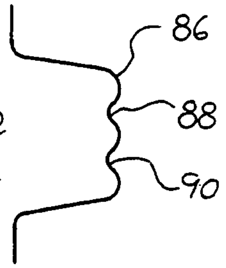
FIG. 9 illustrates a three-line scan intensity profile of spaced beams which have passed through the aperture plate of this invention.

In FIG. 9, the curve 86 corresponds to the situation where the scan lines have a gap therebetween, as in FIG. 6. In this case, the dimples 88 and 90 correspond to the gap area between the scan lines. However, since the gaussian distribution includes some light intensity even within these gaps, the dimples 88 and 90 in curve 86 are not as pronounced as the irregularities or gaps 65 in the curve 72 of FIG. 6. Therefore the overall quality and continuity of vertical lines produced by the distribution shown in FIG. 9 is much better than that produced by prior art aperture plates.

Although a saw-toothed shape is illustrated in FIGS. 3 and 4 for the irregular sides of the apertures, it is within the contemplation of this invention that other shapes may be used to produce the gaussian distribution of the light passing through the apertures, and thus the advantages in image quality afforded thereby. For example, the irregular side shape could be more sinusoidal than shown in the figures, or could be staggered so that the opposite side is not a mirror image of the other side. Whatever the configuration, the irregularity of the aperture openings causes a predictable amount of light to pass through the aperture in the vicinity of the defining edges. Various manufacturing processes can be used to create the irregular surfaces which define the apertures. A particularly useful method is to use a small wire in an EDM process to etch or form the edges of the aperture from a smooth surface. A wire with a radius of 0.1 millimeter can be used for this purpose.

Figure 10:
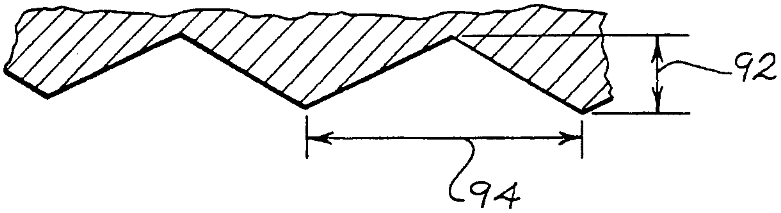
FIG. 10 is a partial view of an aperture illustrating dimensional quantities.

FIG. 10 illustrates dimensions useful in defining the degree of amplitude or variance of the irregular surface from a smooth surface. The dimension 92 represents the amplitude of the irregular surface and changing this dimension can affect the overall distribution of the light passing through the aperture. The dimension 94 represents the repeating or cyclic dimension of the saw-toothed triangular shapes which, according to this specific embodiment, provide the gaussian distribution of the laser spot. An actual operating system constructed according to this invention used a dimension 94 value of 0.8 millimeters, and a dimension 92 value of 0.1×"T", where T=1.0.

Figure 11:
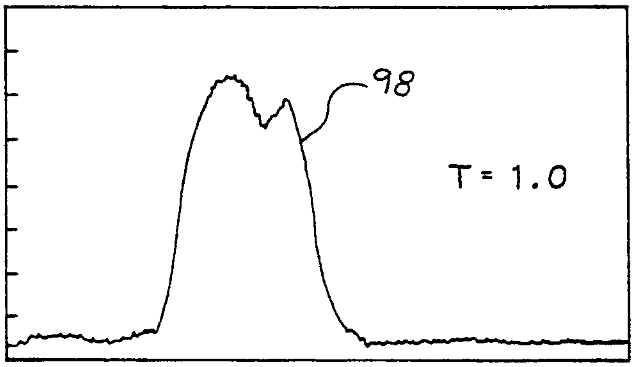
FIG. 11 depicts an actual one-beam intensity profile produced by the present invention for a "T" value of 1.0.
Figure 12:
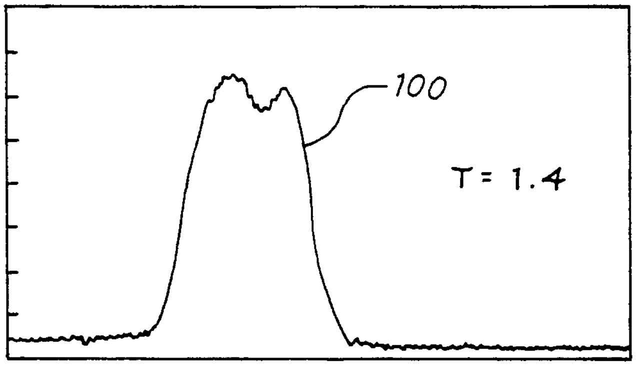
FIG. 12 depicts an actual one-beam intensity profile produced by the present invention for a "T" value of 1.4.
Figure 13:
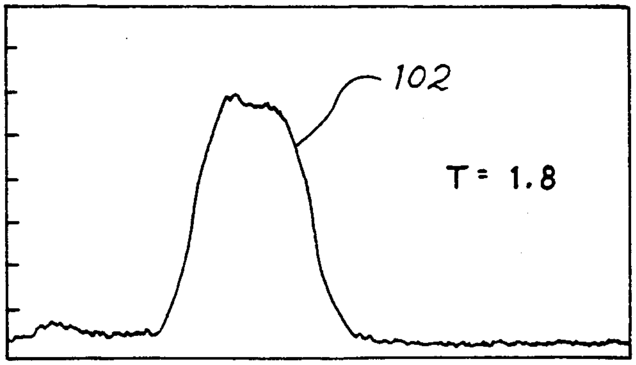
FIG. 13 depicts an actual one-beam intensity profile produced by the present invention for a "T" value of 1.8.

FIGS. 11, 12 and 13 are actual curves of spot intensity distributions produced on an optical bench from an aperture having the saw-toothed irregularities described herein. The amplitude of the teeth were varied to determine the response of the output beam with variations in the amplitude of the irregular surface. In the case where "T"=1.0, curve 98 of FIG. 11 represents the spot intensity profile. Although a gaussian distribution of the edges is apparent from FIG. 11, the discontinuities at the top of the distribution curve 98 are not as smooth as desired. According to FIG. 12, the curve 100 indicates the intensity profile in the case where the amplitude is governed by the value for "T" of 1.4 where the actual amplitude is equal to 1×"T" millimeters. As can be seen in FIG. 12, the overall response of the spot is approaching a true gaussian distribution. FIG. 13 represents a case where "T"=1.8. As shown by curve 102, a very well defined gaussian distribution is developed with the amplitude set at this value.

A disadvantage of using higher "T" values is the fact that some of the amplitude of the laser light is lost in the resulting spot. Consequently, "T" values between the range of 1.4 and 1.8 provide the most economical spot profile consistent with maintaining adequate energy levels and efficiencies. The actual amplitude values used to develop the curves 100 and 102 in FIGS. 12 and 13 respectively, are 0.14 and 0.18 millimeters. In relation to FIG. 10, the ratio of the amplitude of the saw-toothed shape, which distinguishes these edges from smooth edges, and the repeating distance of the saw-toothed shape, is between the values of 0.175 and 0.225, assuming that dimension 94 is 0.8 millimeters and dimension 92 is between 0.14 and 0.18 millimeters.

The teachings of this invention provide for enhanced output quality under conditions where the scan lines are not exactly spaced as desired. It is emphasized that numerous changes may be made in the above-described system without departing from the teachings of the invention. It is intended that all of the matter contained in the foregoing description, or shown in the accompanying drawings, shall be interpreted as illustrative rather than limiting.

We claim as our invention:

1. An exposure system for selectively irradiating a photosensitive member with at least one light beam, said exposure system comprising:
   - a light source producing a stationary light beam;
   - deflecting means for scanning the light beam across the photosensitive member: and
   - an aperture plate positioned between the deflecting means and the light source, said aperture plate having an aperture which is positioned to pass at least a portion of the light from the stationary light beam, said aperture having a shape which provides a substantially gaussian light distribution in at least one dimension after passing through the aperture.

2. The exposure system of claim 1 wherein the light source includes a plurality of laser diodes to produce a plurality of stationary light beams, the deflecting means scans all of the produced light beams across the photosensitive member, and the aperture plate has a plurality of apertures each aligned with a different stationary light beam.

3. The exposure system of claim 2 wherein the aperture plate contains a separate aperture for each stationary light beam produced by the light source.

4. The exposure system of claim 1 wherein the deflecting means scans the beam across the photosensitive member in a direction which is perpendicular to the dimension which exhibits substantially gaussian light distribution after passing through the aperture.

5. The exposure system of claim 1 wherein the dimension which exhibits gaussian light distribution is perpendicular to the direction the beam scans across the photosensitive member.

6. The exposure system of claim 1 wherein the aperture has at least two non-smooth edges which are generally parallel to each other.

7. The exposure system of claim 6 wherein the non-smooth edges of the aperture has a saw-toothed shape.

8. The exposure system of claim 7 wherein the ratio of the amplitude of the saw-toothed shape, which distinguishes the edges from smooth edges, and the repeating distance of the saw-toothed shape, is between the values of 0.175 and 0.225.

9. The exposure system of claim 7 wherein the amplitude of the saw-toothed shape is between 0.14 and 0.18 millimeters.

10. An exposure system for selectively irradiating a photosensitive member simultaneously with a plurality of light beams, said exposure system comprising:
    - means for producing a plurality of light beams;
    - deflecting means for scanning the light beams across the photosensitive member; and
    - masking means, positioned between the light beam producing means and the deflecting means, through which each of the produced light beams must pass before being deflected, said masking means influencing the size of the beam and creating a substantially gaussian distribution of the beam intensity in at least one dimension when it impinges upon the photosensitive member.

11. The exposure system of claim 10 wherein the masking means comprises an aperture plate having a separate aperture for each produced light beam, with each of said beams projecting through its respective aperture.

12. The exposure system of claim 11 wherein each aperture in the aperture plate is defined by at least two edges which have predetermined irregularities spaced along said edges to partially attenuate some of the light passing through the aperture in the vicinity of said edges.

13. The exposure system of claim 12 wherein the irregularities produce a saw-toothed shape along said edges.

14. The exposure system of claim 13 wherein the ratio of the amplitude of the saw-toothed shape, which distinguishes the edges from smooth edges, and the repeating distance of the saw-toothed shape, is between the values of 0.175 and 0.225.

15. The exposure system of claim 10 wherein the dimension of the beam intensity which has a gaussian distribution is aligned perpendicular to the beam scan direction when the beam impinges on the photosensitive member.

16. An exposure system for selectively irradiating a photosensitive member simultaneously with a plurality of light beams, said exposure system comprising:

a laser light source simultaneously producing a plurality of stationary laser beams;

deflecting means for simultaneously scanning the laser beams across the photosensitive member in a cross-track direction; and an aperture plate positioned between the deflecting means and the light source, said aperture plate having a plurality of apertures each of which passes at least a portion of a particular laser beam before being scanned by the deflecting means, said apertures being defined by at least two edges which have predetermined irregularities spaced along said edges to partially attenuate some of the light passing through the aperture in the vicinity of said edges, with the attenuated light being oriented in a direction after being scanned which provides a gaussian distribution of the light in a process direction on the photosensitive member.

* * * * *